(12) United States Patent
Schroth et al.

(10) Patent No.: US 8,905,291 B2
(45) Date of Patent: Dec. 9, 2014

(54) COULOMB DAMPING FEATURES USING ULTRASONIC WELDING

(75) Inventors: James G. Schroth, Troy, MI (US); Thomas A. Perry, Bruce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 950 days.

(21) Appl. No.: 12/902,368

(22) Filed: Oct. 12, 2010

(65) Prior Publication Data

US 2011/0143161 A1   Jun. 16, 2011

Related U.S. Application Data

(60) Provisional application No. 61/286,052, filed on Dec. 14, 2009.

(51) Int. Cl.
B23K 20/10 (2006.01)

(52) U.S. Cl.
CPC .................................. *B23K 20/103* (2013.01)
USPC ...... 228/110.1; 228/1.1; 156/73.1; 156/580.1; 428/594

(58) Field of Classification Search
CPC .... B23K 20/10; B23K 20/103; B23K 20/106; F16F 7/08
USPC .................... 228/1.1, 110.1; 156/73.1, 580.1; 428/594
See application file for complete search history.

(56) References Cited

U.S. PATENT DOCUMENTS

| | | | |
|---|---|---|---|
| 5,942,314 A | 8/1999 | Fisher et al. | |
| 6,332,509 B1 | 12/2001 | Nishikawa et al. | |
| 6,519,500 B1 | 2/2003 | White | |
| 2004/0253473 A1* | 12/2004 | Weekes et al. | 428/595 |
| 2006/0062977 A1* | 3/2006 | Sigler et al. | 428/209 |
| 2008/0185249 A1 | 8/2008 | Schroth et al. | |

(Continued)

FOREIGN PATENT DOCUMENTS

| JP | 57001845 A * | 1/1982 |
|---|---|---|
| JP | S6024335 B2 | 1/1982 |

(Continued)

OTHER PUBLICATIONS

Welding Handbook by AWS, 1991, p. 41.*

(Continued)

*Primary Examiner* — Devang R Patel
(74) *Attorney, Agent, or Firm* — Reising Ethington P.C.

(57) ABSTRACT

Selected surface regions of coulomb vibration damping strips are bonded face-to-face by ultrasonic welding to a surface region of an article that may experience excessive vibration in use. In one embodiment, prior to welding, the intended facing side of the damping strip is treated to form surface regions that are oxidized, roughened, or coating so that the treated regions do not weld to the article surface. In another embodiment of the invention the ultrasonic welding process is controlled so as to produce regions (sometimes randomly interposed regions) of welded and non-welded regions between the damping strip and adjacent article surface. The unbonded regions of the otherwise welded strip lie in closely-spaced, interfacial, frictional contact with the adjacent article surface to damp vibration in the article. Other processes may be used for welding a damping strip to a surface of an article while leaving un-bonded, friction damping regions between regions of the damping strip and the facing surface of the article.

6 Claims, 2 Drawing Sheets

(56) References Cited

U.S. PATENT DOCUMENTS

2009/0022938 A1* 1/2009 Hanna et al. .................. 428/101
2009/0032569 A1* 2/2009 Sachdev et al. ................ 228/2.3
2010/0294063 A1* 11/2010 Schroth et al. .................. 74/411

FOREIGN PATENT DOCUMENTS

| | | |
|---|---|---|
| JP | 2001314980 | 11/2001 |
| JP | 2004114136 | 4/2004 |
| JP | 2004148373 | 5/2004 |

OTHER PUBLICATIONS

Hetrick et al., "Ultrasonic metal welding process in aluminum automotive body construction applications", Welding Journal, Jul. 2009, p. 149s to 158-s.*

Written Opinion and Search Report for application No. PCT/US2010/059637 dated Aug. 29, 2011.

Yajiang Li; Special Welding Techniques; pp. 232-244, Chemical Industry Press, Dec. 2004.

* cited by examiner

COULOMB DAMPING FEATURES USING ULTRASONIC WELDING

This application claims priority based on provisional application 61/286,052, titled "Coulomb Damping Features Using Ultrasonic Welding," filed Dec. 14, 2009 and which is incorporated herein by reference.

TECHNICAL FIELD

This invention pertains to a practice of damping vibrations in an article by use of a thin layer or layers of like or suitable material that has a combination of surface regions welded to a surface on or within an article and un-bonded regions in frictional engagement with the adjacent surface. The bonded regions attach the layer to the adjacent surface and the un-bonded regions of the layer cause coulomb damping (frictional damping) of the adjacent portion of the article to reduce its production or transmission of vibrations.

BACKGROUND OF THE INVENTION

Automotive vehicle body structures, components, and propulsion devices are examples of many articles of manufacture that experience mechanical vibrations in their structure. The vibrations may, for example, occur in a wall or housing or partition structure, or in a shaft, or other structure susceptible to vibrating or passing vibrations. Often such operational or imposed vibrations are of a frequency that, if coupled with the surrounding atmosphere in a manner that makes them audible, can produce distressing noise to a user of the vehicle or other article. Further, vibrations in structures may lead to decreased fatigue life, if the amplitude, frequency, and mode structure are not controlled. Automotive vehicles have many body structures, motors, engine components, power transmission components, brakes, and the like that are designed to serve many functions in addition to operating at an acceptable vibrational or noise level. Still, there remains a need for practices of reducing vibrations and noise output from many such vibratile vehicle parts and other articles of manufacture.

At least in the case of automotive vehicles, such practices are needed both in the design of new vehicle parts for quiet operation and in the modification of existing vehicle parts for reduced broadcasting of noise and minimizing vibrational amplitude.

SUMMARY OF THE INVENTION

This invention provides practices for applying one or more relatively thin layers of material on a surface of an article in a manner and for the purpose of damping vibrations produced in or transmitted through a structural portion of the article underlying the surface. The layer material is of a composition that may be bonded to the surface of the article using ultrasonic welding. An ultrasonic welding head or horn (called a sonotrode) is used to press one side of the layer material against the article surface and impart ultrasonic frequency vibrations to the layer material to bond selected portions of the layer to the surface of the article. As will be described in more detail in this specification, selected areas, regions, or portions of the facing surface of the layer are intentionally not welded to the underlying or adjacent article surface. These unbounded surface portions of the welded layer lie in an interfacial frictional engagement with the adjacent or underlying surface portion, or adjacent body portion of the article, damping vibrations in that adjacent portion of the article. In many embodiments of the invention, the layer material and article are of the same or similar metal alloy composition. In some embodiments of the invention, for example, an entire component (or a portion) may be built from ultrasonically welded layers of material with predetermined, selected fractions of unbonded interfaces in selected layers to provide a desired and intended damping property to the component.

The layer material may be in the nature of a sheet, foil, or tape complementary in two-dimensional shape to the surface or body portion to be damped. The sheet, foil, or tape is prepared with a shape or width to cover a specified surface area on an article, or to form a specified body portion of the article. In one embodiment of the invention, the surface of the sheet that is to be bonded to the article surface or body portion is prepared such that selected portions of the sheet do not fuse to the article surface during an ultrasonic welding process. Such portions of the sheet may, for example, be oxidized or mechanically roughened or adhesively coated with particulate material so that these prepared areas of the sheet are not fused to the article surface, or article body portion, when other, untreated surface regions of the sheet are solid-state welded to the surface of the article. In another embodiment of the invention, the surface of the article may be oxidized, roughened or coated so that selected areas of the sheet do not bond to the prepared areas of the article surface.

Whether selected regions of the sheet or of the article surface (or both) have been thus prepared, the sheet is then placed over the intended surface, in compliance with its profile, and pressed against the surface. An ultrasonic welding sonotrode is ultrasonically activated, pressed against the outer surface of the sheet, and moved (e.g., rolled) over it to fuse portions of the sheet to the article surface. The article then carries a thin sheet bonded to its surface. The thickness of the sheet may, for example, be about 0.1 millimeter up to 0.5 millimeter or so depending on the composition of the sheet material and the energy available for joining. But the sheet-covered region of the article has one or more regions of suitable shape and area in which facing surfaces of the sheet and the article are not bonded, but in frictional damping, interfacial contact with each other. When the article is used and vibrations are induced within or transmitted through the article, they reach the unbonded, facing surface layers, which are frictional damping regions that reduce the magnitude and/or frequency of the vibrations produced in or transmitted through the article. The vibrational energy is dissipated as heat due to the relative motion of the incompletely bonded sheet with respect to the body and the frictional force between them.

Thus, in some practices of this invention, the area of the damping interfaces within the manufactured article is determined or maximized to provide the necessary vibration damping effect for the article. (The added damping interfaces could be located at an anti-node of the normal vibration modes of the article structure.) The added material layer (and/or the surface of the article) is prepared with just enough bonding regions to suitably fix the material layer to the surface of the article in view of the mode of operation of the article. And the added layer is provided with regions that are oxidized, roughened, or provided with other coatings such that these un-weldable regions closely engage the underlying article surface in vibration-damping frictional contact. The ultrasonic welding process is conducted so as to retain these treated regions in an un-welded vibration-damping state. The frictional force could be further enhanced, increasing vibration damping, by judiciously applying heating or cooling during manufacture or by choice of materials with suitable coefficients of thermal expansion so that the strip material is held against the body of the article by residual stresses at the operating temperature of the body.

In another and simplified embodiment of the invention, the ultrasonic welding process may be practiced to selectively bond only certain regions of a sheet to an area of an article surface. For example, a sonotrode may be shaped to contact only selected regions of an added layer to weld such regions of the added layer to the article surface. Un-welded regions of the added layer would lie in frictional damping contact with the article surface.

In still another embodiment of the invention, the sonotrode may only be used to join discrete areas of the strip, while purposely avoiding other areas to be left in friction-damping contact with the article.

In still another embodiment of the invention, the processing conditions of preheat, frequency, amplitude, and load may be chosen so that even when the sonotrode contacts the strip uniformly, a suitable combination of welded and unbonded areas are produced which produce frictional damping of the structure. Thus, in practices of this invention, welding conditions that would normally be determined for optimizing or maximizing ultrasonic bonding of facing surfaces are replaced with ultrasonic welding conditions specifically chosen to produce incomplete bonding between layers and to produce increased frictional damping between the partially welded layers.

In yet another embodiment of the invention, multiple layers of added strip or foil could be applied to increase the damping effect, even up to forming entire components, or portions of components, out of the layered material-having multiple interfaces with bonded and un-bonded regions between them.

Other objects and advantages of the invention will be apparent from a more detailed description of illustrative embodiments which follows in this specification.

DESCRIPTION OF PREFERRED EMBODIMENTS

Figure 1:
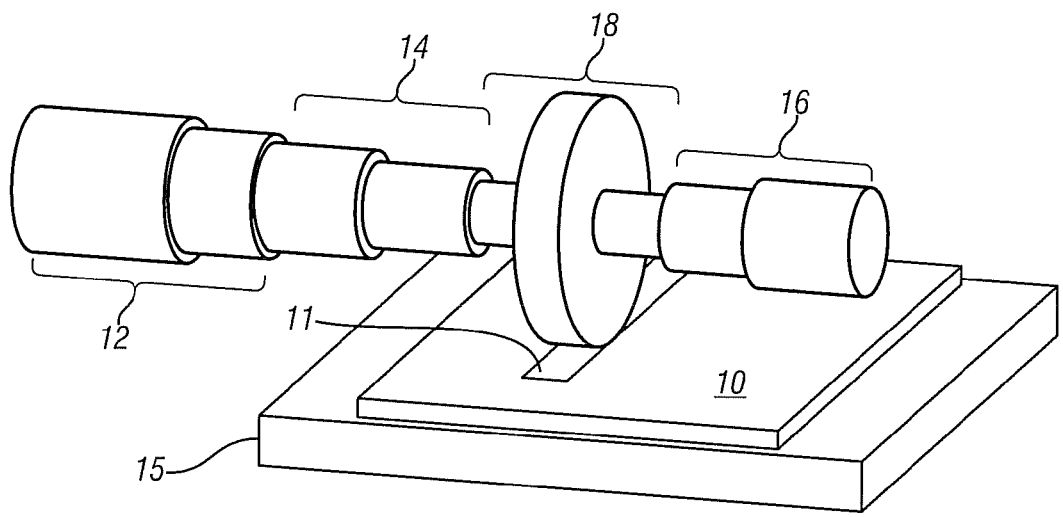
FIG. 1 is a schematic illustration of an ultrasonic welding apparatus comprising a sonotrode for use in practices of the invention. The ultrasonic welding apparatus is illustrated with the sonotrode in the form of a roller where the roller is in rolling contact with a layer of material laid on a surface of a previously formed article or element of an article.

This invention uses ultrasonic welding to bond selected surface regions of a foil, tape, or strip to a surface of an article for the purpose of providing friction damping interfaces between the incompletely bonded strip and the adjacent surface of the article. These friction damping interfaces are formed in vibratile elements or portions of an article that are determined to be potentially susceptible to producing or transmitting unwanted vibrations. In other embodiments of the invention vibration absorbing elements of an article or entire articles may be formed by ultrasonic welding of successive layers of metal foil or sheets to build-up the vibration-absorbing article section or article. In this embodiment, non-welded regions are left between one or more of the layers of the layered structure to provide a desired number of friction damping interfaces.

In an illustrative embodiment of the invention, the article may be the aluminum alloy, cylindrical housing of an electric motor serving to drive one or more wheels of an automotive vehicle, or serving to act as a starter-alternator for a hybrid electric vehicle. Such motors experience heavy working loads in operation. The housings may vibrate or transmit vibrations originating within the motor to produce unwanted noise. In another illustrative embodiment of the invention, a more planar vibratile body structure or component structure of the vehicle may vibrate or transmit vibrations while producing its intended function. An example would be a power electronics enclosure with relatively flat exterior surfaces.

The structure may be formed of a ferrous alloy, an aluminum alloy, a magnesium alloy, or other selected metal alloy in typical automotive vehicle applications. In aerospace or other applications, the structure could also be formed of a nickel alloy, a titanium alloy, or other high performance multi-component alloys. In each of these articles, the vibrational behavior of the article in service may be identified, including natural vibrational modes and/or vibrations resulting from forced excitation from interactions with the component surroundings. And, where appropriate, a strip or tape, or multiple strips or tapes, of joinable composition is sized, shaped, and prepared for ultrasonic welding with significant regions remaining in unbonded, friction damping interface relationship to the prior surface of the vibrating member. It is found that vibrations of frequency in the range of about two kilohertz to about twenty kilohertz and corresponding noise may be significantly reduced.

Practices for ultrasonic welding will be described, followed by practices for preparing coulomb damping tapes or strips for effective noise deadening in accordance with this invention.

In accordance with practices of this invention ultrasonic welding is used to bond selected portions of a thin strip, foil, or tape to a surface of an article or portion of an article. When this process is applied to bond a metal strip to a surface of a metal article, a true metallurgical bond is created over some fractional area of the interface, although no liquid (molten) metal is involved. The ultrasonic consolidation of the metal-metal interface occurs in a solid (non-molten) state environment.

The temperature rise at the interface between layers is below the melting point, typically 35% to 50% of the absolute value of the melting point for most metals, and any heating that occurs is confined to a region a few microns thick. Rapid heat dissipation from the region of bonding ensures that minimal residual stresses arise. As such, post-processing to relieve residual stresses is typically not necessary. Similarly, phase transformation is generally avoided.

The main components of an ultrasonic welding unit 10 are shown schematically in FIG. 1. An ultrasonic generator or power supply (not illustrated) receives main grid electricity at a low frequency, preferably in the range of 50 to 60 Hz, and at a low voltage of 120V or 240V AC. The generator converts the input to an output at a higher voltage, preferably having a frequency in the range of 15 to 60 kHz. A useful working frequency is 20 kHz, which is above the normal range of human hearing of about 18 kHz. Systems employing higher frequencies of 40 kHz to 60 kHz with lower amplitude vibrations are preferably employed for fragile materials, such as very thin foils or substrates which are easily damaged.

The high frequency output of the generator is transmitted to a transducer or converter 12, which converts the signal to mechanical vibratory energy at the same ultrasonic frequencies. State-of-the art transducers operate on piezoelectric principles and incorporate discs or rings made of piezoelectric material, such as piezoelectric ceramic crystals, which are compressed between two metal sections (all illustrated schematically in FIG. 1). An advanced generator features automatic tuning adjustment in relation to the transducer so that constant amplitude of vibration is maintained during the operation of the welding unit.

The vibratory energy of the transducer 12 is transmitted to the booster 14 (illustrated schematically), which decreases or increases the amplitude of the ultrasonic waves. The waves are then transmitted to the sonotrode (also called a horn) 18, which is a custom-made tool that comes in contact with the workpieces. The sonotrode 18 may be designed as a toolholder carrying a tool bit, or it may be provided in one integrated piece incorporating specific geometric features. In many embodiments for application of a tape, foil, or strip to a surface of an article, the sonotrode 18 may be formed as a roller with axles for rolling contact with the upper surface of the strip. In the embodiment of FIG. 1, the vibrations are transmitted axially with respect to the roller axis of sonotrode 18. For ultrasonic welding of metals the sonotrode is preferably made of tool steel and it may be manufactured as a unitary component. As further illustrated in FIG. 1, sonotrode 18 roller is also provided with a "dummy booster" 16. The dummy booster 16 is a passive element that is symmetric to the booster portion of the tool that allows the development of a stable standing wave with stationary nodes at sonotrode supports (not shown in the Figures) and anti-node at the workpiece to be welded.

As further illustrated in FIG. 1, an article 10 (or portion thereof) and a strip 11, for producing a vibration damping interface with the article surface may be held under the pressure of the contact surface of the sonotrode 18. A supporting anvil or fixture 15 may be used to support the assembly. Further, where desired, means may be used to apply the damping strip under tension in face-to-face compliance with the surface of the article to be damped. It is also common practice in ultrasonic welding and ultrasonic consolidation to preheat the supporting body during welding. The preheat temperature is well below the melting point of the substrate or the added material, the tape or foil in this case.

Figure 2A:
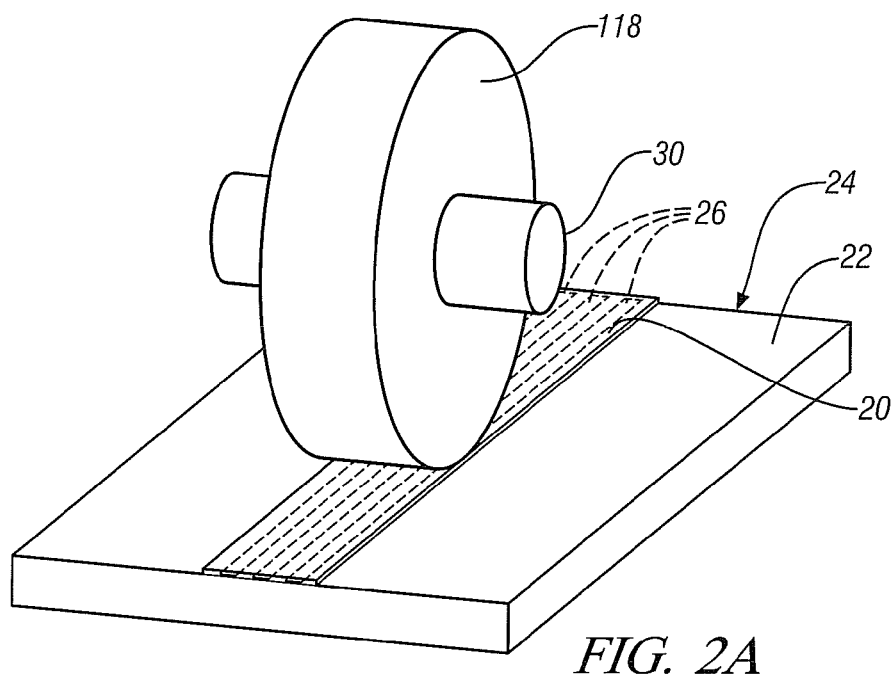
FIG. 2A is a schematic illustration of a sonotrode pressing in rolling engagement with a rectangular sheet strip laid on a rectangular surface of an article, such as a section of a support bracket. The sheet has length-wise oxidized stripes on its surface facing the article surface to prevent welding of the stripe-covered regions to the underlying article.
Figure 2B:
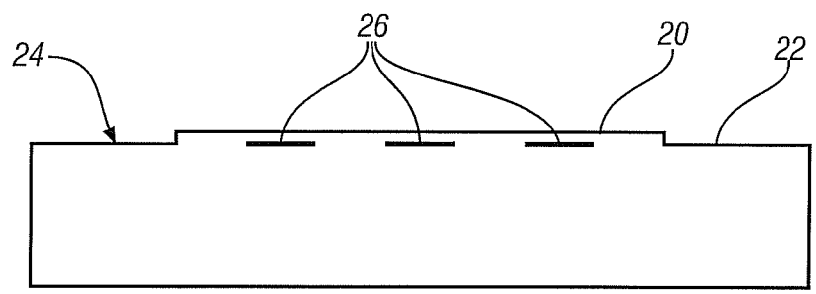
FIG. 2B is an illustration of an end view of the article with portions of the strip welded to the upper surface of the article. The cross-sections of the three stripes are cross-sections of un-bonded areas of the welded strip that provide frictional damping interfaces with the upper surface of the article.

FIGS. 2A and 2B illustrate the application of a metal strip 20 (the generic term strip is intended to include a foil or tape) to a portion of surface 22 of a metal plate 24. Metal plate 24 illustrates a generally planar portion of any article which experiences unwanted vibration. In automotive vehicle applications the metal may be any of various steel alloys, aluminum alloys, magnesium alloys, and the like. Preferably, the compositions of metal strip 20 and metal plate 24 are the same or similar to better accommodate ultrasonic welding of selected surface portions. However, dissimilar metal materials may be used as long as they can be joined by ultrasonic welding to a substrate metal material. In this illustration both strip 20 and plate 24 are formed of the same aluminum alloy (e.g., AA3003) and are readily joined, flat surface to flat surface, by ultrasonic welding.

The size and shape of metal plate 24 will depend on its function in the article of which it is a part. Metal strip 20 will typically be quite thin, for example from about one-tenth of a millimeter up to about one-half of one millimeter in thickness. Its shape in plan view will be determined with respect to available or necessary damping area on surface 22 of metal plate 24. In FIG. 2A, aluminum alloy strip 20 is illustrated as shaped to lie as a parallel-sided band in the center of rectangular aluminum alloy plate member 24.

Aluminum alloy strip 20 is prepared with regions of predetermined area that will not bond to surface 22 of aluminum alloy plate 24. In FIG. 2A these regions are illustrated as three, spaced longitudinal stripes 26. Stripes 26 are actually on the bottom surface of strip 20 lying face-to-face against upper surface 22 of plate 24. Ordinarily, stripes 26 would not be visible in the view of FIG. 2A (except at the end of strip 20), but they are illustrated as dashed-hidden lines to show their location on the unseen bottom surface of strip 20.

The surface area regions indicated by stripes 26 are preformed in the facing side of strip 20 so that regions will not be welded to surface 20. In the case of light metal alloys, such as aluminum or magnesium alloys, stripes 26 may be formed by anodizing to form striped oxide layers that are not degraded by the welding process. Or stripes 26 may be formed by application of any substance that would interfere when processed with the ultrasonic welding sonotrode, such as a thin adherent coating of high melting-point particle or solid state lubricant or other lubricant or grease. In another embodiment, stripes 26 may be formed by suitable roughening of the surface of strip 20 so that ultrasonic welding does not fuse the roughened surface to surface 22 of plate 24. But the purpose of the pretreatment of the intended facing side of damping strip 20 is to prepare surface regions that will not be bonded to plate 24. To the contrary, striped regions 26 are to serve as unbonded regions in friction damping engagement with surface 22 of plate 24.

As illustrated in FIG. 2A, strip 20 is placed stripes 26 side down on surface 22 of plate 24. Sonotrode 118, shaped as a roller with a width corresponding to strip 20, is pressed against the upper surface of strip 20 and rotated on axle shaft 30. Sonotrode 118 is activated (by means not illustrated in FIG. 2A, but illustrated schematically in FIG. 1) to cause the formation of a welded bond between the facing surfaces of strip 20 and plate 24 except for the regions of stripes 26 formed on the facing surface of strip 20. As illustrated in the end-view of FIG. 2B, strip 20 is fused to plate 24 except for stripes 26 regions. These un-bonded strip regions run the full contacting lengths of strip 20 and plate 24, and provide face-to-face friction damping contact within the otherwise wholly fused interface of formed strip 20 and plate 24.

The proportion of fused interface and un-bonded interface between strip 20 and plate 24 is pre-determined to maintain strip 20 secured to plate 24 as plate 24 serves its intended function, often as part of a larger article of manufacture. And the striped regions are sized and located to provide their interfacial vibration and noise damping function in the article in which they are incorporated.

Figure 3:
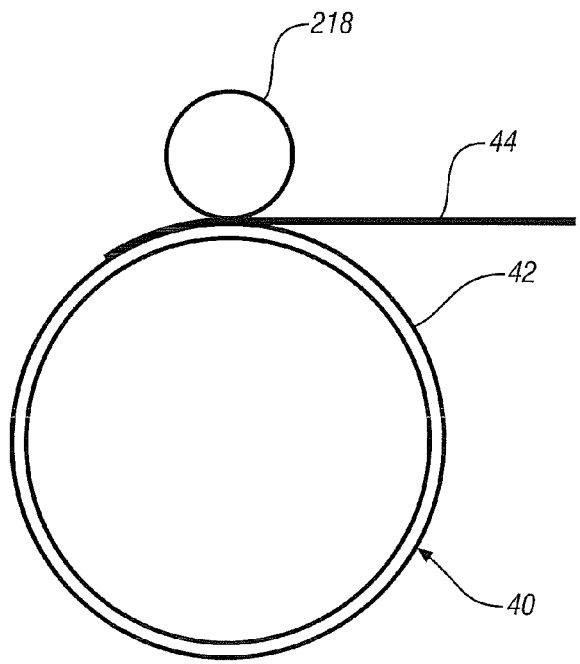
FIG. 3 is a side view of a round metal housing, such as an enclosure for an electric motor. A metal strip of suitable metal composition is being pressed into good conformance with the outer surface of the housing and welded to the outer surface using a sonotrode. Prior to the ultrasonic welding step, surface regions of the strip have been treated so that the treated regions are not welded to the housing, but lie in friction damping contact with it. It is understood that for some geometries a support mandrel (not shown) may be needed within the housing to support applied loads of the ultrasonic welding process.

FIG. 3 illustrates another embodiment of the practice of the invention. In this embodiment, a round housing 40, such as a metal housing for an electric motor for driving one or more vehicle wheels, is to be modified (or made in the first instance) to dampen vibrations and noise. In such a motor, the electrical components (e.g., rotor and stator components would be assembled in housing 40 and end-piece closures applied. But in this example, a circumferential damping strip 44 is to be applied to a predetermined portion of the outer surface 42 of cylindrical motor housing 40. Preferably, the metal alloy compositions of housing 40 and damping strip 44 are the same or sufficiently similar to facilitate easy ultrasonic welding.

Again, the intended facing surface of strip 44 is prepared with non-bonding regions to serve as friction damping surfaces against the outer surface 42 of housing 40. The proportions of welding regions and damping regions are predetermined to serve their respective functions.

As illustrated schematically in FIG. 3, an edge of damping strip 44 is pressed against housing surface 42, parallel to the axis of housing 40, by any suitable fixturing means (not specifically illustrated). Sonotrode 218 (again, adapted in the form of a roller) is pressed on the outer surface of damping strip 44 and activated to commence welding of the intended bonding regions of damping strip 44. The damping strip 44 may thus be bonded around the full outer surface 42 of housing 40 or to other selected areas of the housing surface 42.

In the above illustrated practices of the invention, selected regions of the damping strip were altered to prevent welding of those regions to a facing article surface. However, in some situations it may be preferred to alter selected regions of an article surface to prevent welding of those regions to a facing surface of a damping strip. Altering of selected regions of a damping strip surface and/or of an article surface may be accomplished by any suitable means that prevents them from being joined when they are lying face-to-face and subjected to ultrasonic welding energy.

In another embodiment of the invention neither of the added strip or a surface of the article are altered or modified. In this embodiment the ultrasonic welding process and/or the contacting surface of the sonotrode are managed to weld only selected regions of the added strip to the surface of the article. In one variant of this practice, one or more process parameters for welding are intentionally chosen to be unlike those nominally used to maximize soundness of the bonded interfaces. Thus, process preheat temperatures are lowered, welding forces decreased, welding amplitudes decreased, and/or welding speeds increased in order to form desired incompletely bonded surfaces such that the unbonded portions of the interface are available to provide coulomb damping of the structure. In accordance with this approach, the structure of a well bonded, face-to-face, layered structure is intentionally replaced with a face-to-face, layered structure with suitable welded regions for interfacial strength and with suitable unbonded regions for frictional vibration damping between the facing layers.

Figure 4:
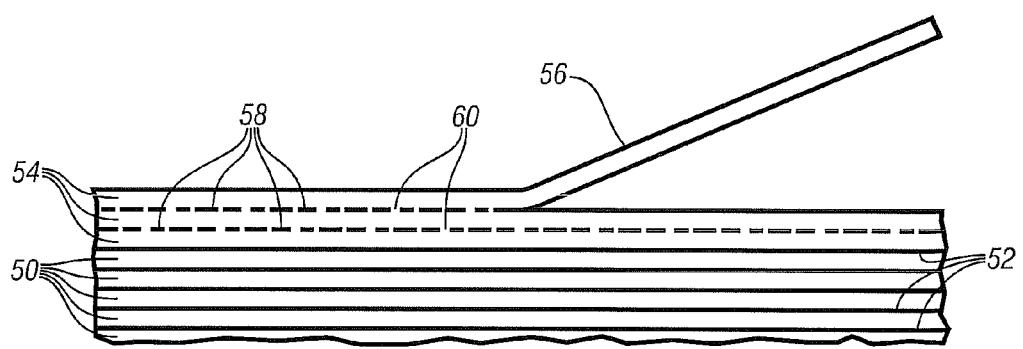
FIG. 4 is a schematic illustration of an article being formed by the sequential ultrasonic welding of a series of thin strips or foils to build up an article structure of welded layers. The ultrasonic welding process parameters are then intentionally chosen so that some fraction of non-welded interfaces are formed between at least two of the layers to provide interfacial friction damping within the welded layer structure and between two of the touching layers.

FIG. 4 illustrates, in a fragmentary, cross-sectional, side view, a practice of the invention in which at least a portion, or component, of an article of manufacture is being formed by welding several layers of metal foil or sheets by ultrasonic welding. One may start with a previously-formed base layer or sheet, and build up a structure portion, layer-by-layer, by successively ultrasonic welding 0.15 mm thick aluminum alloy (AA3003) sheets 50. The first layers 50 are thoroughly and uniformly welded over their entire contacting surfaces as indicated by the solid lines 52 in the cross-sectional view. A sonotrode in the form of a roller (not illustrated in FIG. 4) may be used with each succeeding layer pressed downwardly on a previously welded metal sheet layer. However, as predetermined by trial or calculation, one or more of the later applied layers 54, 56 are joined to an underlying layer by an ultrasonic welding process in which regions of the interfacial contacting surfaces are not welded. In FIG. 4, sheet layer 54 has been joined to immediately underlying sheet 50 by an ultrasonic welding practice in which interfacial contacting regions, indicated by dashed lines 58 are weld regions and interfacial contacting regions 60 (no welding line) are not welded. In regions 60 the facing surfaces of aluminum alloy strips 54 and 50 are merely in face-to-face frictional, vibration damping contact. The welded regions 58 and non-welded regions 60 may be of any suitable pattern and size. They are illustrated schematically in FIG. 4. The respective welded and non-welded regions may, for example, be small in width and quite random, depending on the welding process parameters. As further illustrated in FIG. 4, an additional aluminum alloy strip 56 is being joined to strip 54 in a like pattern of welded bands 58 and bands 60 that are in friction damping contact.

Thus, as described, in some practices of the invention, one or more thin layers are thus applied to a surface of an article (or in the initial making of an article) for reducing vibrations in the surface or adjacent regions of the article. In other embodiments of the invention whole articles, or selected portions or sections of an article, may be initially formed by ultrasonic welding of layers of material so that a suitable number or arrangement of interfacial coulomb damping regions are formed between some or all of the ultrasonically welded layers. In the practice of this invention the damping regions may be formed in any configuration and contacting surface area determined by experiment, experience, modeling, or the like to attain a desired coulomb vibration damping result. Likewise, the means by which the un-welded regions are formed on a damping layer may be the result of testing or experience for a particular article shape, usage, and material of construction.

The illustrations presented in this specification are intended to assist those skilled in the art to practice the invention and not to limit the scope of the invention.

The invention claimed is:

1. A method of damping vibrations in an article of manufacture, the article being formed of an aluminum or magnesium alloy, the method comprising;

identifying a surface area of the article producing or transmitting such vibrations, the vibration-producing or vibration-transmitting area having a length;

preparing an added material layer of a metallic composition and a thickness in the range from about 150 micrometers to about one-half millimeter, the layer having a shape for bonding to the surface area of the article, the layer having a first surface for bonding to the surface area of the article, and a second surface;

placing the first surface of the layer in surface-to-surface contact with the identified surface area of the article; and applying an ultrasonic welding tool against the second side of the layer and activating the tool to form an ultrasonic weld between one or more selected predetermined regions of the first surface of the layer and the surface of the article, the remaining regions of the welded layer having non-welded surface-to-surface friction damping contact with the surface of the article, the welded regions consisting of a plurality of substantially parallel, spaced-apart strips extending along the length of the surface area, each welded strip being of generally uniform width and each welded strip being spaced-apart from adjacent welded strips by one of a plurality of non-welded regions extending along the surface area length.

2. A method of damping vibrations in an article of manufacture as recited in claim 1 in which at least one additional material layer is prepared and placed on the added material layer that has previously been joined to the article of manufacture by the plurality of spaced-apart, ultrasonically welded, strips, a predetermined number of such additional material layers being applied such that a then-formed vibratile element comprises a plurality of welded interfaces where at least two or more interfacial areas, but not necessarily all of the interfacial areas, are formed between an ultrasonically welded metal layer and an underlying metal surface and characterized by a combination of welded regions and regions having non-welded surface-to-surface friction damping contact.

3. A method of damping vibrations in an article of manufacture as recited in claim 1 in which a first portion of a metallic vibratile element structure is formed of two or more ultrasonically welded material layers of the metal composition of the structure, each material layer being welded to the structure sequentially, and wherein each interface between adjoining material layers of the first portion is either a wholly welded interface or a partially welded, friction damping interface; the nature of each interface being determined to provide a desired level of interfacial frictional damping of vibrations in the first portion of the metallic vibratile element structure.

4. A method of making an article of manufacture as recited in claim 1 in which the at least one region of the first surface of the material layer is altered chemically or mechanically to prevent welding in the non-welded regions with the first portion of the structure.

5. A method of damping vibrations in an article of manufacture as recited in claim 1 in which the article and metal layer are both formed of the same metal composition.

6. A method of damping vibrations in an article of manufacture as recited in claim 1 in which the added material layer is a foil or a sheet.

\* \* \* \* \*